United States Patent [19]

Wenskus, Jr. et al.

[11] Patent Number: 5,238,380

[45] Date of Patent: Aug. 24, 1993

[54] APPARATUS FOR PRECISION VOLUMETRIC CONTROL OF A MOLDABLE MATERIAL

[75] Inventors: James J. Wenskus, Jr., Rochester; Alan B. Miller, Scottsville, both of N.Y.

[73] Assignee: Eastman Kodak Company, Rochester, N.Y.

[21] Appl. No.: 774,601

[22] Filed: Oct. 10, 1991

Related U.S. Application Data

[62] Division of Ser. No. 585,538, Sep. 21, 1990, Pat. No. 5,063,008.

[51] Int. Cl.[5] ............................................. B29C 45/77
[52] U.S. Cl. ..................................... 425/145; 264/405; 425/149; 425/150
[58] Field of Search ............... 425/140, 145, 149, 150; 264/40.4, 40.5

[56] References Cited

U.S. PATENT DOCUMENTS

| | | | |
|---|---|---|---|
| 2,433,132 | 12/1947 | Lester | 164/153 |
| 2,671,247 | 3/1954 | Lester | 425/149 |
| 3,859,400 | 1/1975 | Ma | 425/145 |
| 3,940,465 | 2/1976 | Hauser et al. | 425/150 |
| 3,976,415 | 8/1976 | Hauser et al. | 425/145 |
| 4,060,362 | 11/1977 | Wilson, III | 425/145 |
| 4,131,596 | 12/1978 | Allen | 264/40.5 |
| 4,135,873 | 1/1979 | Sone et al. | 425/147 |
| 4,146,601 | 3/1979 | Bishop | 264/40.1 |
| 4,740,148 | 4/1988 | Fujita et al. | 425/149 |
| 4,767,300 | 8/1988 | Buja et al. | 425/140 |
| 4,767,579 | 8/1988 | Buja et al. | 264/40.5 |
| 4,904,172 | 2/1990 | Buja | 425/140 |
| 4,913,638 | 4/1990 | Buja | 425/140 |

FOREIGN PATENT DOCUMENTS

| | | |
|---|---|---|
| 2527976 | 4/1983 | France . |
| 53-11974 | 4/1978 | Japan . |

OTHER PUBLICATIONS

James J. Wenskus, Jr.; "Transfer Point Control Comparison Between Mold Parting Line and the Standard Strategies"; 1988.
Franz Strohmaier; "Improvements i Machine Mechanical and Control Performance".
Engle; "Practical Application of the Program MICROPLAST for the Quality Control at Injection Moulding"; Jun., 1988.

*Primary Examiner*—Tim Heitbrink
*Attorney, Agent, or Firm*—Joshua G. Levitt; Charles E. Snee, III; Robert E. Heslin

[57] ABSTRACT

An injection molding machine control device where mold element separation distance is measured and integrated as a function of time while moldable material is being introduced in the mold cavity between the mold elements. When the integral value reaches a preselected value, the mold injection pressure is changed and the moldable material is allowed to cure within the cavity.

10 Claims, 6 Drawing Sheets

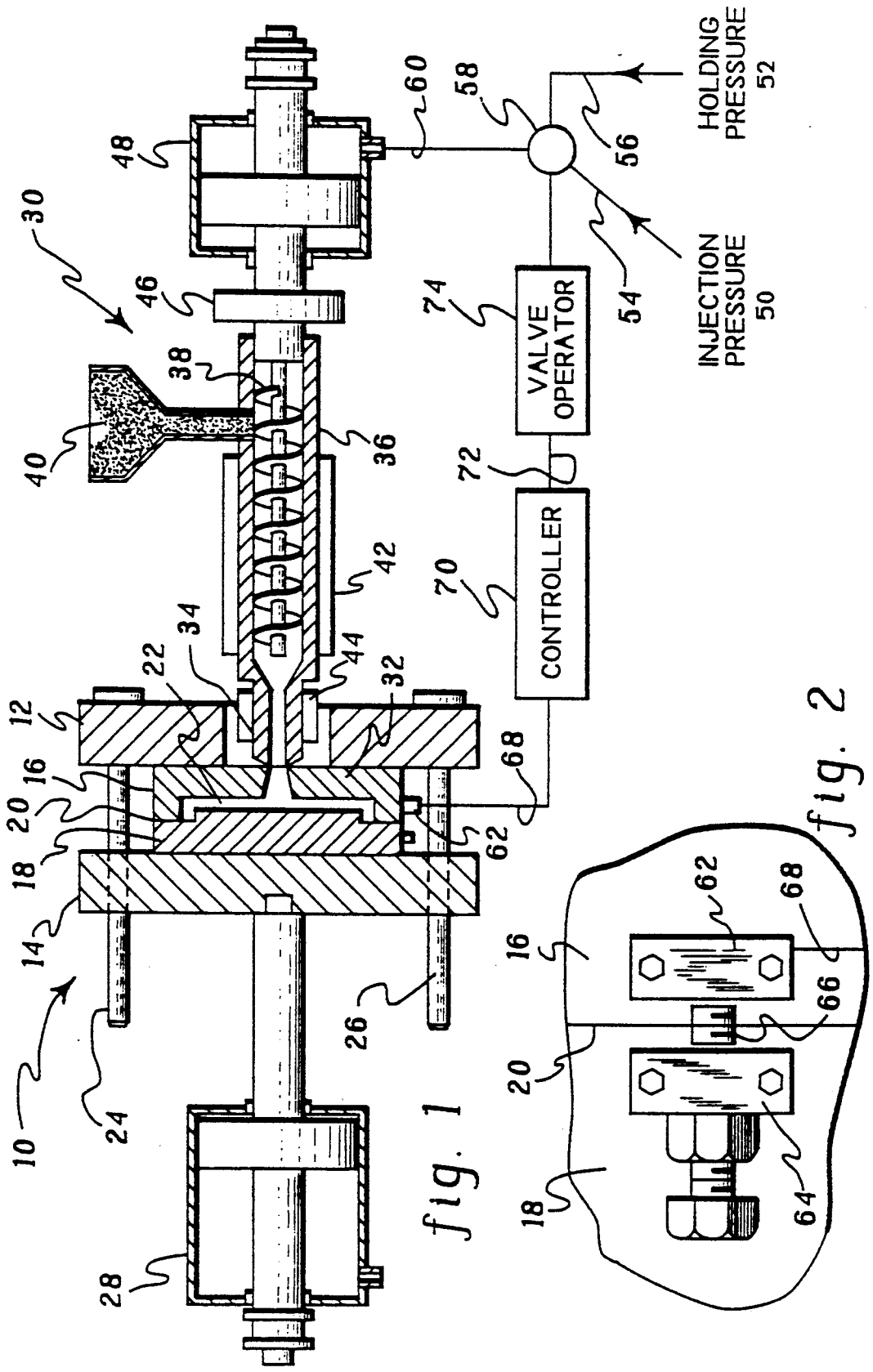

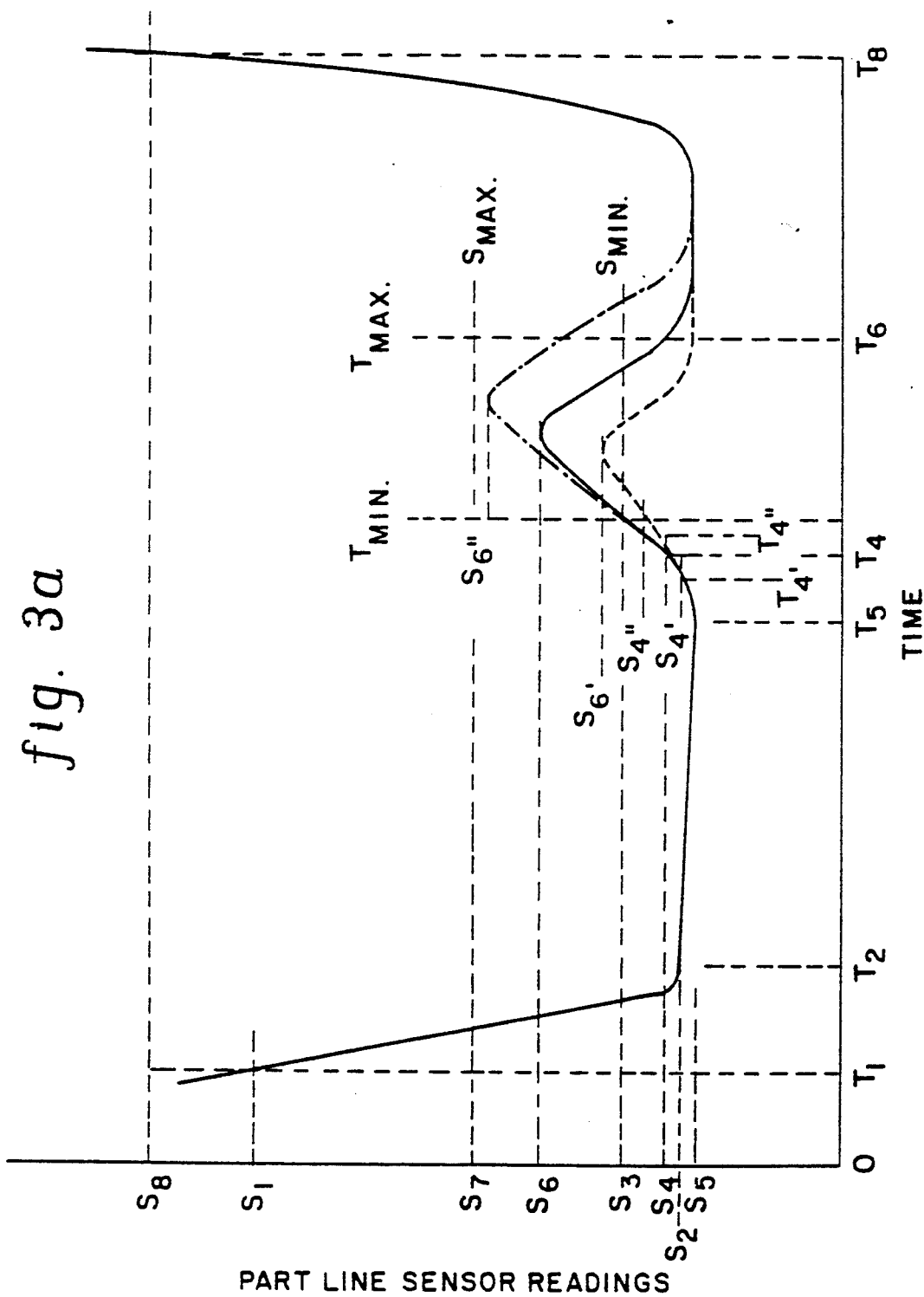

APPARATUS FOR PRECISION VOLUMETRIC CONTROL OF A MOLDABLE MATERIAL

This application is a division of application Ser. No. 07/585,538, filed Sep. 21, 1990, now U.S. Pat. No. 5,063,008.

BACKGROUND OF THE INVENTION

1. Field of the Invention.

The present invention is directed to the field of injection molding and, more particularly, to an improved method and apparatus for controlling the quantity of a moldable material introduced into the mold cavity by monitoring the area under the part-line separation curve.

2. Description of the Prior Art.

The production of consistent and uniform products by the injection molding process has been a long-standing objective in the injection molding art. This objective has become relatively difficult to achieve as more and more injection molding products are produced which are increasingly complex with stricter tolerances. Furthermore, the trend towards fewer and fewer operators monitoring the injection molding processes and apparatus requires more precision automatic control of the process and apparatus.

The injection molding process involves a variety of interrelated parameters present in the injection molding material, apparatus, and control systems. Among these parameters are the type of material being molded, the consistency of the plastic and its characteristics, the molding cycle time, the machine shot size and/or weight, melt viscosity and temperature consistency, mold clamp pressure and injection pressure. As each of these parameters varies during the operation of an injection molding process the product uniformity may suffer without constant operator attention.

Various techniques have been utilized to determine which parameters should be monitored more closely to yield a more consistent molded structure and provide a more reliable injection molding process and apparatus. In the injection molding art, it is necessary to precisely control the amount of moldable material entering the mold cavity during the injection, or filling, phase of the injection molding process.

U.S. Pat. Nos. 2,433,132, 3,976,415 and French Patent No. 2,527,976 teach measuring the part-line separation in the mold elements to determine when to change the molding process from the injection phase to a pulsing of an injection ram to maintain a constant part-line separation during the curing of the mold. However, it has not been feasible to attain high precision accuracy with this technique.

U.S. Pat. Nos. 2,671,247 and 3,859,400 teach monitoring the pressure within the mold itself to determine when to terminate the injection of molding material. However, monitoring pressure alone does not result in a molded product of the desired precision because no compensation is made for variations in other parameters not taken into account. U.S. Pat. No. 3,940,465 teaches measuring the part-line separation of the mold to control the cure time of the molding cycle. Similarly, this technique also fails to reflect all of the other variables which must be accommodated and taken into account to accurately control the molded part weight and its dimensions.

U.S. Pat. No. 4,135,873 teaches the measurement of the part-line separation and comparing the separation with a predetermined value and thereafter varying the injection pattern of the injection ram during the following molding cycle. This system does not provide control of the process on a real time basis, reflecting system conditions that are affecting the current cycle. Such a system merely reflects what occurred on the previous cycle, resulting in a tendency for the system to hunt rather than zero into a mode of operation which provides product consistency.

U.S. Pat. No. 4,131,596 teaches the measurement of the part-line separation to reduce the mold clamping pressure upon the measurement of a predetermined separation to minimize any damage to the mold due to flashing of the material at the part-line. This, of course, does not contribute to the control of product weight and dimension.

Japanese Patent Publication No. 11974 of 1978 discloses a method of controlling an injection molding machine wherein the part-line separation is measured and, upon reaching a predetermined reference separation, the machine is switched from a material filling mode to a dwelling mode. The mold separation is then measured and the maximum separation is determined. Thereafter, pressure during the dwell or curing phase of the mold cycle is controlled dependent upon the maximum separation reached to control the final mold separation value at the end of the cure time. Thereafter, the reference separation value for the switch point for the following cycle is changed to accommodate the variations in the machine operation detected during the first cycle. This system of control has the disadvantage that the switch point is determined by the preceding cycle and thus does not reflect the conditions of the current cycle. This system of control thereafter attempts to adapt to the variations in the molding conditions existing during the current cycle by controlling the holding pressure during the cure phase of the cycle which can adversely affect part weight and density uniformity.

U.S. Pat. No. 4,146,601 teaches the method of integrating the hydraulic pressure with respect to time until the cavity pressure reaches a predetermined value. The integrated value is compared with a predetermined value and an adjustment is made in the temperature and viscosity of the material in subsequent molding cycles. This technique is very complicated and information is based upon a prior cycle, not the current injection cycle. As a result, precision and accuracy are compromised.

U.S. Pat. Nos. 4,767,300 and 4,767,579 disclose a method and apparatus for control of an injection molding process based upon the part-line movement of the two faces of the injection mold. Although this system provides a control system which is reasonably effective within a limited range of perturbation in the operating parameters, its effectiveness quickly diminishes as that range is exceeded. This is due primarily to the fact that the relationship between part-line distance and the volume or weight of the moldable material being injected is not linear.

It is apparent from the foregoing that existing control systems tend to be overly complicated, inaccurate and incapable of making same-cycle corrections. Moreover, they generally require almost constant operator attention.

It is therefore an object of this invention to provide a method and an apparatus for precisely controlling the volume of moldable material injected into a mold during a molding process.

It is a further object of the invention to provide a method and an apparatus of the type stated which permits precise control in spite of relatively large perturbations in operating parameters.

It is a further object of this invention to provide a method and an apparatus of the type stated requiring relatively little monitoring by an operator.

Finally, it is an object of this invention to provide a method and an apparatus of the type stated which exercises control over the molding operation on a real time or same-cycle basis. In other words, data gathered and computed during a given molding cycle is used to control that very same cycle rather than subsequent cycles.

SUMMARY OF THE INVENTION

The present invention involves the computation of the area under the curve (sometimes referred to as "AUC" hereinafter) which results when a sequential series of part-line separation measurements is plotted as a function of time during the injection or filling portion of a molding cycle. Interestingly enough, we have found that this area under the curve (AUC) bears a direct relationship with the volume of moldable material being delivered to the mold even though operating parameters such as injection pressure may vary from their normal settings within normally expected ranges. Thus, once an optimum value for the area under the curve is experimentally determined, it becomes possible to correlate that value with the desired volume of moldable material and the resulting part weight of the object being molded. Part weight is, of course, one of the primary indicia of part quality.

The improved method of this invention may be used with a molding machine of the type having a pair of separable mold elements and, further, having the capability of injecting moldable material therein at a first pressure and holding said material therein during curing at a second pressure. The method comprises the steps of closing the mold elements, introducing moldable material into the mold cavity at a first pressure and periodically measuring the separation of the mold elements while moldable material is being introduced into the cavity. Also, the method includes integrating, as a function of time, the part-line separation distance while the moldable material is being introduced into the cavity, detecting when the integral reaches a preselected value and changing the pressure from the first pressure to the second when the integral reaches the preselected value. Finally, opening the mold elements occurs when the moldable material has cured.

The method may also include continuing the measuring and integrating steps after the pressure has been changed and until the mold elements cease separating, comparing the integral value to a further preselected value and generating a signal indicative that the molded product is defective if the integral does not substantially correspond to the further preselected value. The method may include activating an alarm signal which may also stop the molding cycle and opening the mold elements and/or activating a later reject/sort device.

The method may also include determining the time in the molding cycle at which the first preselected value is reached and generating a signal that the molded product is defective if the time falls outside a predetermined acceptable range. Again, the signal could be used to stop the molding cycle and open the mold elements and/or to activate a later reject/sort device.

The invention also provides for an improved molding apparatus having a pair of separable mold elements forming a mold cavity therebetween, means for opening and closing the mold elements, means for introducing a moldable material into the mold cavity at a first pressure and for exerting a second pressure on the moldable material, means for measuring and integrating the separation distance of the mold elements as a function of time as the mold elements separate while the moldable material is being introduced into the mold cavity, means for detecting when the integral value reaches a preselected value and for then changing from the first pressure to the second pressure.

The apparatus may also include means for continuing the measuring and integrating functions after changing the pressure and until the mold elements cease separating, means for comparing the resulting integral value to a second preselected value, and means for generating a signal indicative that the molded product is defective based upon the value of the integral when separation ceases. The apparatus may also include an alarm responsive to the signal, means responsive to the signal for stopping the cycle and opening the mold elements and/or a means for activating a later reject/sort device.

Also, the apparatus may include means for determining the time in the molding cycle at which the first preselected value is reached and for generating a signal that the molded product is defective if the time falls outside a predetermined range. The signal generated by the apparatus may operate an alarm, stop the molding cycle and open the mold elements and/or activate a later reject or sort device.

The present invention contains certain advantages over the prior techniques of volumetric control of an injection molding process. The linear relationship of the AUC to the product weight provides a definite improvement in the control of the volume compared to conventional techniques. The part weight can be controlled over a far wider range of external error sources and sorting of the molded product may be more accurately performed because the desired product characteristics are more precisely achieved through monitoring and control of the AUC. Furthermore, we have found that when using an AUC control strategy as described hereinafter, errors due to machine "skidding" are reduced. Also, the AUC control technique provides far superior compensation for changes in the dynamic response of the molding machine components as compared with other control strategies.

Various means for practicing the invention and other features and advantages thereof will be apparent from the following detailed description of the illustrative preferred embodiments of the invention, reference being made to the accompanying drawings.

BRIEF DESCRIPTION OF THE DRAWINGS

FIG. 1 is a sectional view of an injection molding apparatus in accordance with the present invention;

FIG. 2 is an enlarged view of the distance sensor and target as mounted on the mold elements for sensing the part-line separation;

FIGS. 3, 3a are a graphic illustration of a sample part-line curve representing the separation distance of the mold elements as a function of time;

FIGS. 4-1 to 4-3 depict a flow chart representing the steps performed by the controller of FIG. 1 in accordance with the present invention.

DESCRIPTION OF THE PREFERRED EMBODIMENT

Figures 1, 4:
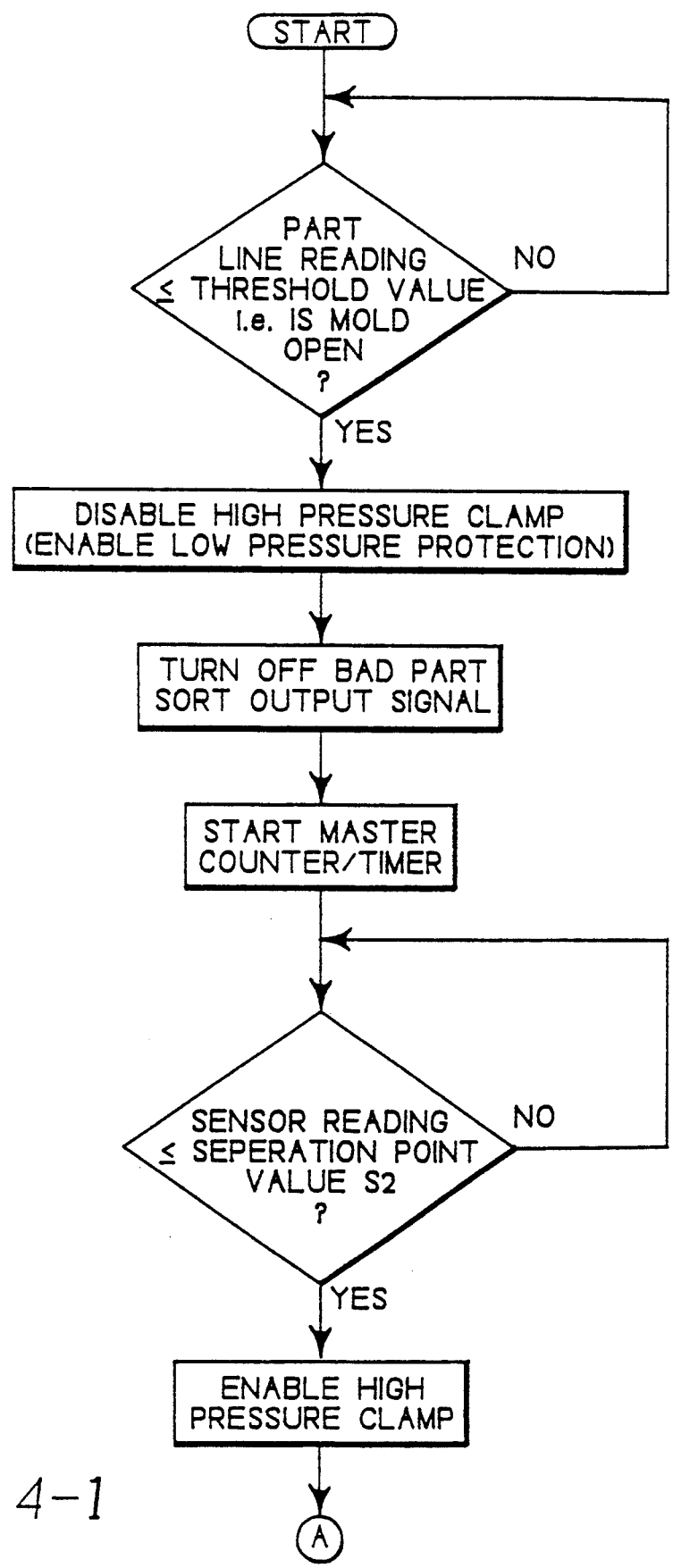

One form of an injection molding apparatus 10 is illustrated in FIG. 1 and comprises a pair of pressure platens 12 and 14 arranged to carry a pair of mold elements 16 and 18, respectively. The mold elements are arranged to meet at a part-line 20 and form a mold cavity 22 therebetween, all in a manner well known in the art. Platen 12 and the mold element 16 associated therewith are stationarily arranged on the machine while platen 14 and mold element 18 associated therewith are movably arranged to be displaced along tie bars 24 and 26 between an open and closed position by a hydraulic cylinder 28.

A plastic extruder assembly 30 is arranged to engage a gate 32 in the mold element 16 with an injection nozzle 34 at the outlet end of the extruder. The main portion of the extruder comprises an extruder barrel 36 having a rotating plasticating screw 38 therein which receives particulate material from a supply 40, and via heat and manipulation plasticates the material for injection through nozzle 34 into the mold cavity 22. To aid in the plastication of the material the extruder barrel is provided with encasing heater elements 42 and 44, in a manner well known in the art. The screw is rotated by a gear 46 driven by a motor, not shown, and is driven longitudinally to inject the molten material into the mold cavity by means of a hydraulic cylinder 48. The hydraulic cylinder 48 is provided with hydraulic fluid from a power source in order to drive the screw longitudinally during the injection process. The hydraulic fluid supply provides both a high pressure for the injection phase of the cycle as well as a low pressure for the holding phase of the cycle, as is well known in the art. One example of such a hydraulic supply comprises separate sources of high injection pressure 50 and lower holding pressure 52 connected by lines 54 and 56 to a control valve 58 which determines which pressure is supplied by line 60 to the hydraulic cylinder 48.

While a reciprocating screw injection molding machine is illustrated for the purposes of describing the present invention, it will be appreciated by those skilled in the art that other forms of injection molding machines such as plunger and transfer-compression molding machines may also be employed.

Figures 2, 4:
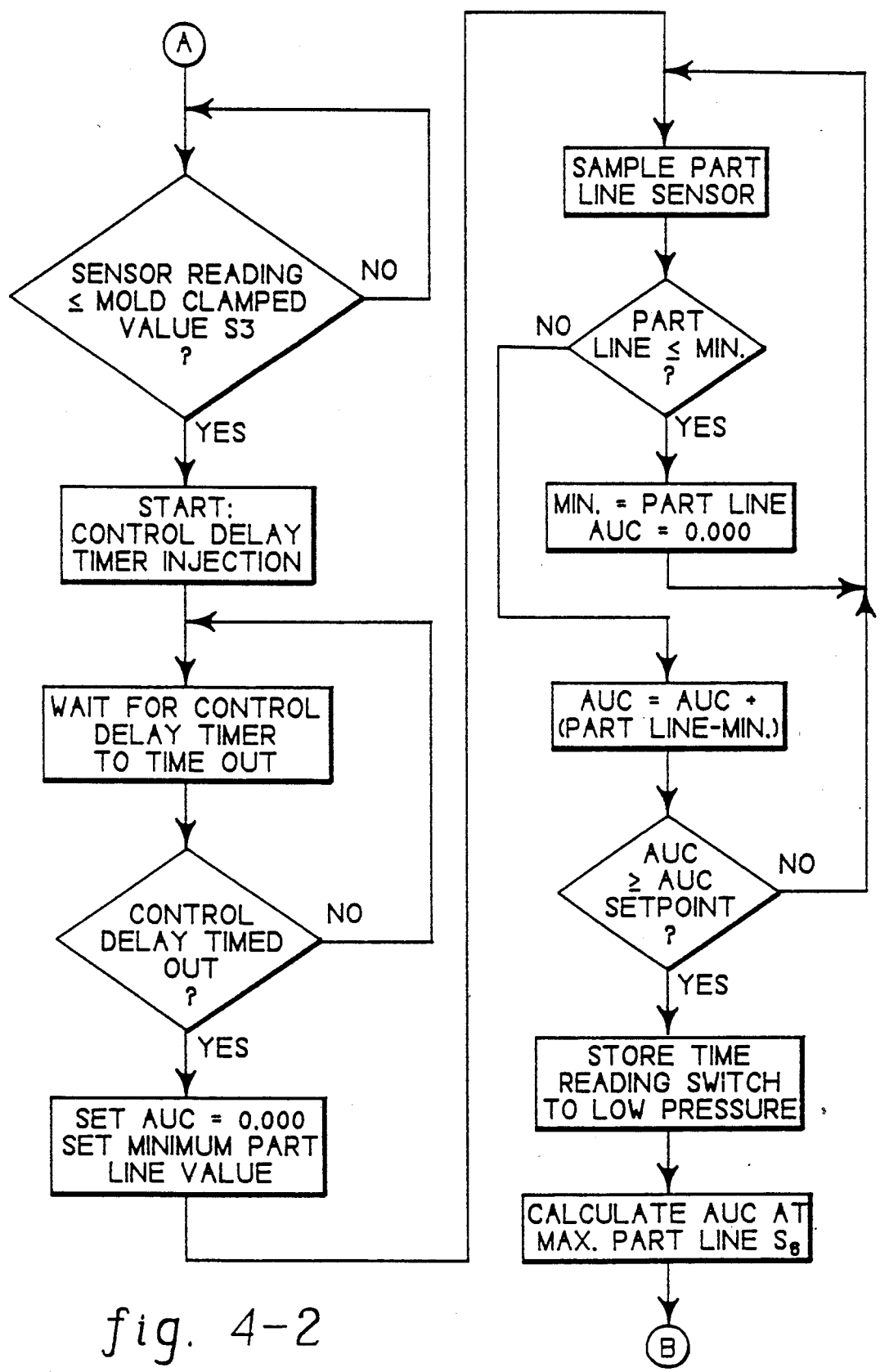
Figures 3, 4:
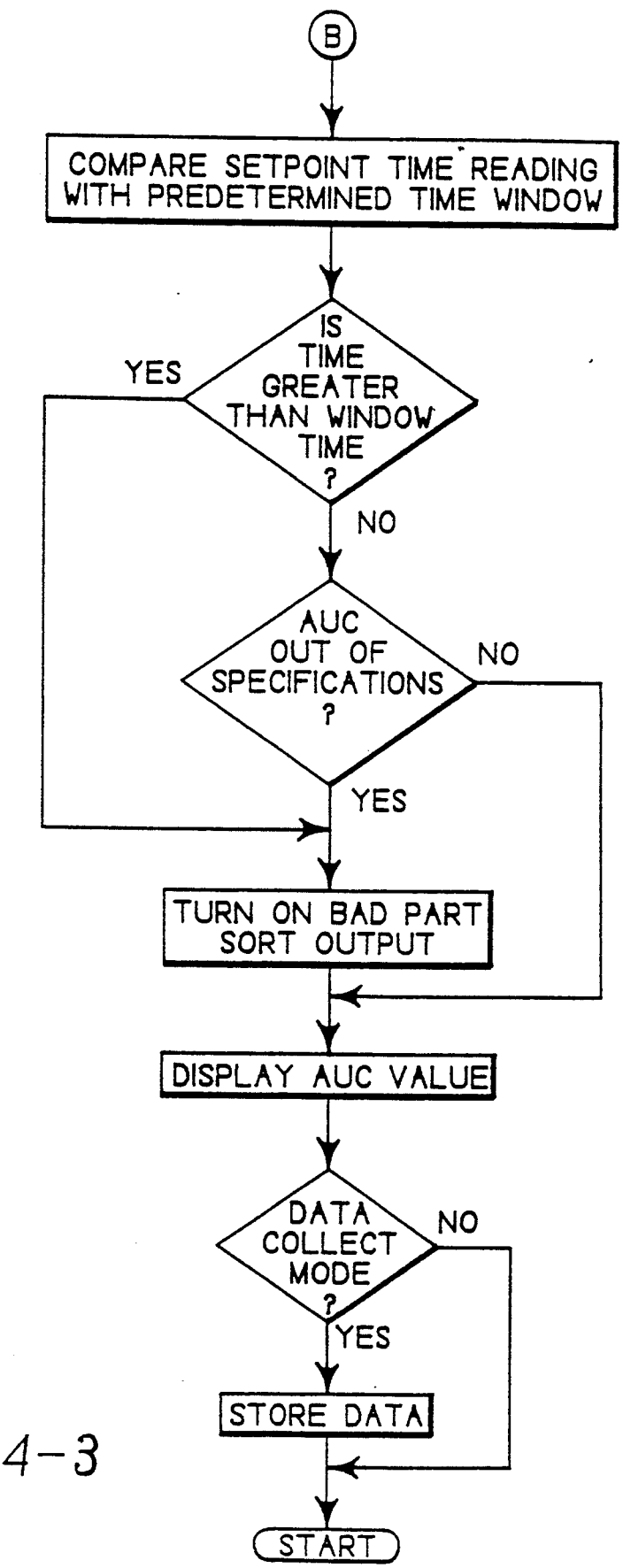

A distance sensor 62 is mounted on the stationary mold element 16 adjacent part-line 20. A distance sensor target 64 is mounted on the movable mold element 18 in opposition to the sensor 62 as shown in FIG. 2. The target may comprise an adjustable bolt or pin member 66 which is arranged to provide the target for sensor 62. The sensor and target are arranged to come into close proximity when the mold elements are closed and clamped but are carefully positioned so that at no time do they contact one another. The sensor element 62 may be of any type known in the art including capacitive, inductive, optical, or other type proximity sensor having a substantially linear output over a range from +10 volts to −10 volts representing a distance range of 0.020 inches.

As shown in FIG. 2, the proximity sensor 62 provides an analog output signal via line 68 to a central processing unit, or controller 70, the operation of which will be described herein below. The controller 70 is arranged to provide an output signal via line 72 to actuate a portion of the molding apparatus, such as a valve actuator 74, which is connected to valve 58. Thus, depending upon data received from sensor 62, controller 70 provides an appropriate output to valve actuator 74 to switch the valve 58 from the high injection pressure 50 to the lower holding pressure 52, or vice versa, to thereby control the cycle of the injection molding machine in accordance with the present invention.

It has been found that when an injection molding machine is operated with a sensor sufficiently sensitive to accurately measure the part-line separation between the mold elements 16 and 18, that a characteristic time/displacement (separation) curve is generated for that machine. It has also been found that the integral of the part-line separation dimension represented by this curve or the area under the time/displacement curve bears a substantially direct, linear relationship to the part weight, and hence, the volume of moldable material being injected into the mold cavity, regardless of normally occurring perturbations in operating parameters and variations in machine characteristics affecting the molding cycle.

Figure 3:
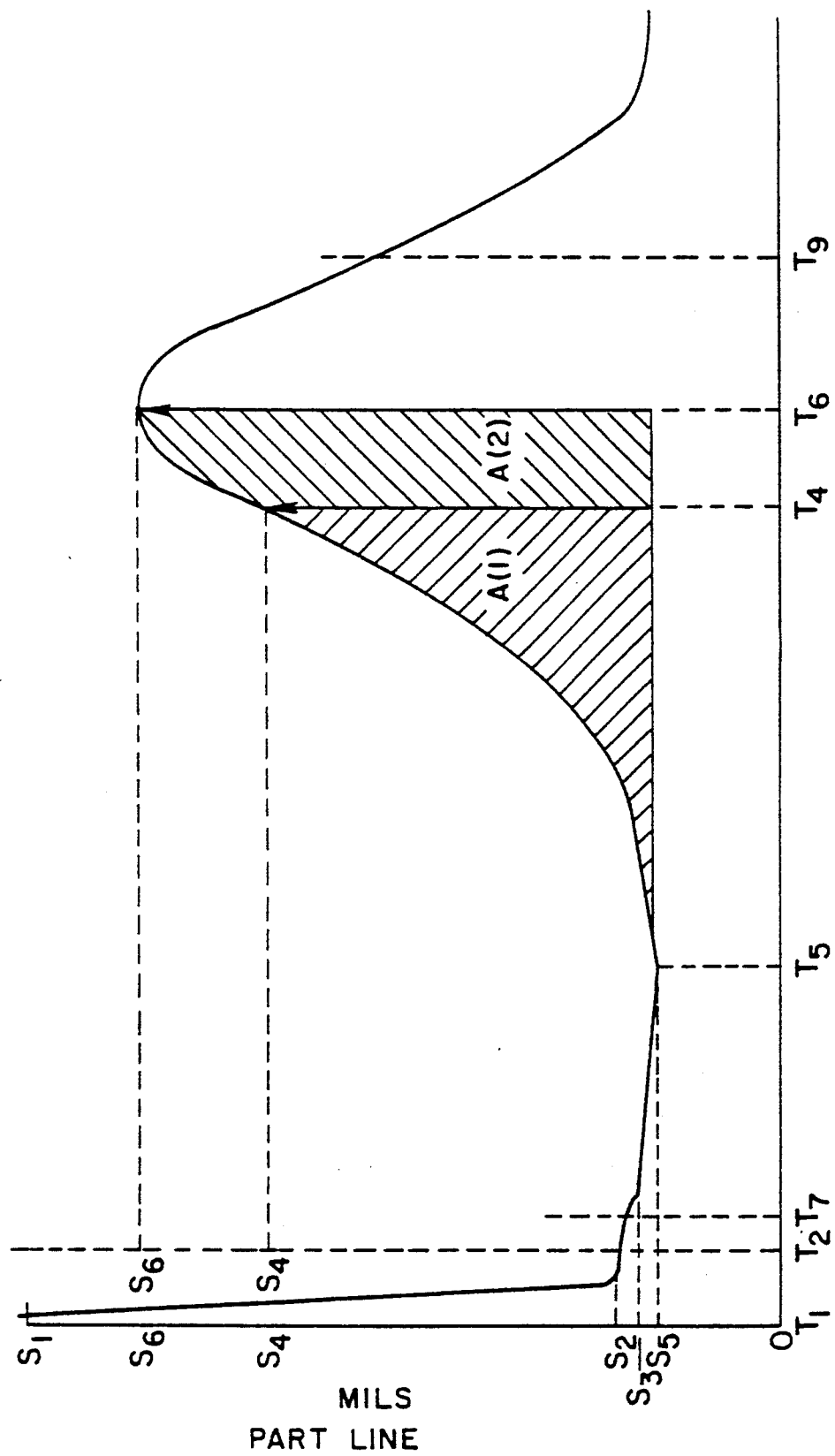

One example of such a time/displacement curve is illustrated in FIG. 3 and will be referred to in the following description of the operation of the present invention in conjunction with the logic chart illustrated in FIG. 4-1 to 4-3. The curve represents the variation of the part-line separation with respect to time during a single molding cycle of an injection molding machine operating at a steady state condition after stabilization following start-up. As the empty mold elements begin to close, the part-line sensor will start to indicate the part-line separation as the mold elements approach each other. As the mold elements approach a predetermined separation $S_1$, which is designated the Entry Threshold, a separation of 0.0095 inches, for example, the high pressure clamp system on the injection molding press is disabled, actuating the low-pressure protection portion of the system. As is well known to those skilled in the art, the purpose for operating the system in this manner is to guard against the possibility that high pressure clamping force will be applied before the system confirms that the last made part has been successfully ejected from the mold. As the Entry Threshold is crossed by the continued closing of the mold elements a master counter/timer within controller 70 is actuated at $T_1$ and a "bad part sort" output signal, which may have been activated from the previous cycle, is disabled or turned off.

As the mold elements continue to close, the part-line separation reaches a "low pressure protection clamp" separation point $S_2$ and the machine high-pressure clamping of the mold is activated so that the molten plastic material may be injected into the mold cavity. Thereafter, the master timer reaches the mold closed control delay timer point $T_7$, and the part-line separation sensor is read to determine the actual measurement of part-line separation which may be sensed after final closing and clamping of the mold elements at $S_3$. After it is determined that the mold elements have been clamped together, the injection of the molten material into the mold cavity is initiated with the injection ram 48 operating under the high injection pressure 50. As the mold fills the part-line separation value decreases slightly to a minimum value $S_5$ at $T_5$ which may be 0.005 inches for example. When a minimum separation has been reached the controller 70 stores this value as a reference value and begins to calculate the area under the curve. The area under the curve is calculated by controller 70. This is accomplished by frequently reading the part-line value, subtracting the minimum value stored at $T_5$ and adding the difference to the existing AUC value. This operation is illustrated in FIG. 4-2.

Also, we have found that with the use of AUC control, the transfer point at which the system switches from high pressure to low pressure will occur within a reasonably predictable time. Furthermore, if this transfer point is not reached within that time, the part weight will exceed specification. It is therefore possible to establish a suitable window of time within which the transfer point will occur for an acceptable product. Controller 70 can therefore be appropriately programmed to initiate a window timer near the beginning of the part-line sampling process. If the transition point is not reached before the window time is timed out, then an appropriate signal can be generated for an alarm and/or sorting out of the part in question as a bad part. The window timer steps are likewise illustrated in FIG. 4-3. When the mold begins to fill to capacity the mold elements begin to separate along the part-line as shown in the position of the curve after $T_5$. When the AUC reaches a predetermined area under the curve set point value, e.g. control point $S_4$ at $T_4$, a control signal is delivered by the controller to the valve operator 74, switching valve 58 from the high injection pressure 50 to the lower holding pressure 52. Thereafter, because of the finite lag in the signal activating the valve 58 and the injection ram responding to the change in pressure, as well as other inertial or "skidding" effects in the operation of the machine, the part-line separation will continue to increase until it reaches a maximum $S_6$. At that point the material in the mold will begin to cool and shrink and the part-line separation will fall back to approximately the initial mold closed separation $S_3$ during the curing or cooling phase of the molding cycle.

The controller may be programmed to continue to calculate the AUC up to this point. Once the material being molded has cured, the mold will be opened and the part ejected and the sensor will indicate that the part-line separation, has exceeded the Exit Threshold $S_8$. When the maximum part-line separation value $S_6$ is detected and measured, the AUC may again be calculated. This value can be compared with a preselected standard value to determine if the molded product meets specifications.

As noted above, the area under the curve is calculated by subtracting the mold closed minimum separation value $S_5$ from the currently measured part-line separation value. Since the minimum separation value is determined for every cycle, variations in the performance of the machine are accommodated.

The molding process is initiated after the sensor has been installed in the molding machine and the controller wired to the appropriate controlling portion of the machine. The injection molding machine is then operated and the operating parameters such as injection pressure and clamping force are adjusted until the machine produces acceptable parts. During this operation the controller is set to the "monitor mode" whereby part-line separations and the corresponding area's under the curve are measured and monitored with appropriate data being retained in the controller memory. Appropriate adjustments are made to the process by the machine operator to achieve satisfactory molded parts. As the satisfactory parts are identified, the AUC measurements made for those satisfactory parts are utilized to determine the desired predetermined AUC set point, low pressure protection point value and control offset, as well as the minimum part-line separations to be used for controlling the process. At the same time, the appropriate control delay times are also being selected by the operator according to the particular characteristics of that individual machine. As soon as sufficient data has been collected to ensure the operator that the sampling is representative, and the values have been set into the controller, the controller may be switched to the "control mode" wherein it commences the control of the injection molding process.

Using AUC control methods, as described above, the part weight consistency of the machine output is significantly improved, as compared with known control methods. As a result, the average size of the product can be slightly reduced since the assurance of consistency and repeatability of part size and weight provided by the present invention allows for the reduction of mean-part weight. The operator need now only use that amount of raw material required to achieve the smallest statistically acceptable product resulting in a material savings while still remaining above the minimum part weight determined for the uncontrolled operation of the machine.

Various timers within the present system allow an operator to select the appropriate interval at which to perform a function appropriate to that particular machine. The timers may activate blanking signals to limit the reading of the part-line separation sensor and/or area under the curve to the appropriate window period in the cycle. Thus, any vibration or jitter present in the machine that occurs during the blanked portions will not provide spurious part-line separation signals that could adversely affect the overall machine control. For example, as shown in FIG. 3 calculation of the area under the curve will begin at control delay time $T_7$ and end at window time Moreover, as noted above, the timing offset $T_9$, or some other predetermined time, may act as a maximum time to reach the area under the curve set point value; if the set point value is not reached within the offset time $T_9$ then a signal is generated and/or the system may be reset.

Accordingly, the present invention provides a method and apparatus for controlling an injection machine and process by using the integral of, or area under, the part-line separation curve of the mold elements as a verification of achieving product quality. The control and measurement of the area under the curve assures part completion, uniformity and quality. The present invention provides an improved verification technique such that the variable parameters in the molding machine and process are combined to achieve the specified part. Because of the improved product quality provided by the present invention, substantial reductions in part rejects are achieved. This results in improved costs by minimizing the amount of material regrind necessary as well as the improved quality raw material from reduced regrind. With a reduction in rejects also comes a reduction in labor. Still further, older molding machines are capable of producing higher quality products with reduced labor and increased flexibility permitted by frequent mold and process changes while still providing the requisite product quality.

While the invention has been particularly shown and described with respect the certain preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. An improved apparatus for precision volumetric control of a moldable material in an injection molding process comprising:
   a pair of separable mold elements forming a mold cavity therebetween;
   means for opening and closing the mold elements;
   means for introducing a moldable material into the mold cavity at a first pressure and for exerting a second pressure on the moldable material;
   means for detecting the separation of the mold elements while the moldable material is being introduced into the cavity;
   means for measuring and integrating the separation of the mold elements as a function of time as the mold elements separate while the moldable material is being introduced into the mold cavity; and
   means for detecting when the integral value of the separation reaches a preselected value and for changing the pressure from the first pressure to the second pressure upon detecting the preselected value.

2. The apparatus according to claim 1, wherein the means for measuring and integrating the separation of the mold elements detects the minimum separation of the mold elements; and measures and integrates after detection of the minimum separation of the mold elements.

3. The apparatus according to claim 1, further comprising:
   means for continuing the measuring and integrating after the changing of pressures until the mold elements cease separating;
   means for comparing the value of the integral when the separation ceases to a further preselected value; and
   means for generating a signal indicative that the molded product is defective based upon the value of the integral when separation ceases.

4. The apparatus according to claim 3, further comprising an alarm responsive to the signal.

5. An apparatus according to claim 3, further comprising means responsive to the signal for stopping the cycle and operating the mold element.

6. An apparatus according to claim 3, further comprising means for actuating a later sorting device.

7. An apparatus according to claim 1, further comprising means for determining time in a molding cycle at which said preselected value is reached and for generating a signal indicative that the molded product is defective if the time falls outside a predetermined acceptable range.

8. The apparatus according to claim 7, further comprising an alarm responsive to the signal.

9. An apparatus according to claim 7, further comprising a means responsive to the signal for stopping the cycle and opening the mold elements.

10. The apparatus according to claim 7, further comprising a means for actuating a later sorting device.

* * * * *

UNITED STATES PATENT AND TRADEMARK OFFICE
CERTIFICATE OF CORRECTION

PATENT NO. : 5,238,380
DATED : August 24, 1993
INVENTOR(S) : Wenskus, Jr. et al.

It is certified that error appears in the above-indentified patent and that said Letters Patent is hereby corrected as shown below:

Column 6, line 10, delete "-".
Column 8, line 36, insert --$T_9$. -- before "Moreover".

Signed and Sealed this

Twenty-sixth Day of April, 1994

Attest:

BRUCE LEHMAN

Attesting Officer

Commissioner of Patents and Trademarks